US012157421B2

(12) United States Patent
Mora et al.

(10) Patent No.: US 12,157,421 B2
(45) **Date of Patent: *Dec. 3, 2024**

(54) FIXED ANGLE CAR MOUNT FOR A MOBILE DEVICE

(71) Applicant: 1Lss, Inc, Los Angeles, CA (US)

(72) Inventors: Fernando Mora, Reseda, CA (US); Alejandro Baca, Sherman Oaks, CA (US); Mydul R. Islam, Los Angeles, CA (US); Kevin H. Vuong, Baldwin Park, CA (US)

(73) Assignee: 1Lss, Inc, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,992

(22) Filed: Feb. 14, 2024

(65) Prior Publication Data

US 2024/0246494 A1 Jul. 25, 2024

Related U.S. Application Data

(63) Continuation of application No. 17/545,362, filed on Dec. 8, 2021, now Pat. No. 11,945,371.

(51) Int. Cl.

*B60R 11/00* (2006.01)
*B60R 11/02* (2006.01)
(Continued)

(52) U.S. Cl.

CPC .............. *B60R 11/00* (2013.01); *B60R 16/03* (2013.01); *H02J 7/0044* (2013.01); *H02J 50/10* (2016.02);
(Continued)

(58) Field of Classification Search

CPC ..... B60R 2011/0005; B60R 2011/0077; B60R 11/0241; H02J 50/10; G06F 1/1607
(Continued)

(56) References Cited

U.S. PATENT DOCUMENTS

| | | | |
|---|---|---|---|
| 5,322,255 | A | 6/1994 | Garrett |
| 5,529,271 | A | 6/1996 | Dunchock |

(Continued)

FOREIGN PATENT DOCUMENTS

| | | |
|---|---|---|
| CN | 214755564 | 11/2021 |
| CN | 217532731 | 10/2022 |

(Continued)

OTHER PUBLICATIONS

TeslaRati-480° Phone Mount for Tesla (Optional Wireless Charging) https://shop.teslarati.com/products/tesla-phone-mount-swivel-rotate (visited Sep. 27, 2021).

(Continued)

*Primary Examiner* — Justin M Larson

(74) *Attorney, Agent, or Firm* — Thomas Coester Intellectual Property

(57) ABSTRACT

A mount for a mobile device on an internal display screen of an automobile. A housing defines a volume and has a device side attachment surface and a back surface. The housing also has an attachment extension to couple to the internal display such that the device side attachment surface has a permanently fixed orientation relative to the attachment extension. The housing may contain a wireless charger and a first arrangement of magnetic material. The magnetic material exposes a pattern of magnetic fields at the device side attachment surface. The attachment extension has a display screen coupling surface with an arcuate contour that substantially mates with a contour of the internal display screen.

17 Claims, 6 Drawing Sheets

(51) Int. Cl.
*B60R 16/03* (2006.01)
*G06F 1/16* (2006.01)
*H02J 7/00* (2006.01)
*H02J 50/10* (2016.01)

(52) U.S. Cl.
CPC ................ *B60R 2011/0003* (2013.01); *B60R 2011/0005* (2013.01); *B60R 2011/0077* (2013.01); *B60R 11/0241* (2013.01); *G06F 1/1607* (2013.01)

(58) Field of Classification Search
USPC ......................................... D14/447; D13/108
See application file for complete search history.

(56) References Cited

U.S. PATENT DOCUMENTS

| | | | | |
|---|---|---|---|---|
| 5,619,395 | A | 4/1997 | McBride | |
| 6,149,116 | A | 11/2000 | Won | |
| 6,490,437 | B1 | 12/2002 | Bisplinghoff | |
| 7,431,253 | B2 | 10/2008 | Yeh | |
| 7,750,783 | B2 | 7/2010 | Hasegawa | |
| D669,432 | S | 10/2012 | Park | |
| 8,317,146 | B2 | 11/2012 | Jung | |
| D722,959 | S | 2/2015 | Bulgarov | |
| 9,283,898 | B2 | 3/2016 | Azadi | |
| 9,395,757 | B2 * | 7/2016 | Relf | G06F 1/1607 |
| 9,764,693 | B1 | 9/2017 | Biondo | |
| 9,973,013 | B2 | 5/2018 | Yan | |
| 10,059,205 | B2 * | 8/2018 | Woodhouse | B60K 35/50 |
| 10,066,784 | B2 | 9/2018 | Wessels | |
| D832,209 | S | 10/2018 | Kang | |
| 10,261,543 | B2 | 4/2019 | Schachter | |
| 10,405,658 | B2 * | 9/2019 | McCrate | A47B 97/00 |
| 10,574,801 | B1 | 2/2020 | Leimer | |
| 10,736,407 | B1 * | 8/2020 | Jin | H04M 1/04 |
| D933,667 | S | 10/2021 | Siminoff | |
| 11,159,047 | B2 | 10/2021 | Haug | |
| D937,278 | S | 11/2021 | Balch | |
| 11,320,856 | B2 | 5/2022 | Magargee | |
| 11,375,813 | B2 | 7/2022 | Holt | |
| 11,712,115 | B2 | 8/2023 | Cheney | |
| 11,796,124 | B2 | 10/2023 | Kim | |
| 11,945,371 | B2 * | 4/2024 | Mora | G06F 1/1632 |
| 11,996,016 | B2 * | 5/2024 | Choi | F16M 11/2021 |
| 2012/0037771 | A1 | 2/2012 | Kitchen | |
| 2014/0061406 | A1 | 3/2014 | Chevalier et al. | |
| 2014/0162733 | A1 | 6/2014 | Cole | |
| 2015/0301559 | A1 | 10/2015 | Wu et al. | |
| 2017/0328517 | A1 | 11/2017 | Wessels | |
| 2020/0212693 | A1 | 7/2020 | Alvez | |
| 2021/0066969 | A1 | 3/2021 | Sun | |
| 2021/0207761 | A1 | 7/2021 | Kim | |
| 2021/0273486 | A1 | 9/2021 | Tang | |
| 2022/0228707 | A1 | 7/2022 | Ng | |
| 2023/0173992 | A1 | 6/2023 | Mora | |

FOREIGN PATENT DOCUMENTS

| | | |
|---|---|---|
| DE | 202018002553 | 7/2018 |
| KR | 20100119191 | 11/2010 |

OTHER PUBLICATIONS

Tesla Model 3 Wireless Charger Phone Holder/Mount for iPhone, Samsung and All, Dashboard/Console 360 Rotation Phone Stand, for Model Y T-Mount by Plafnio https://www.amazon.com/Wireless-Charger-Dashboard-Rotation-Plafnio/dp/B07XVPJG53 (visited Sep. 27, 2021).

TPARTS Magnetic Cell Phone Car Mount for Floating Display Compatible with Model 3/Y https://www.amazon.com/TPARTS-Magnetic-Floating-Display-Compatible/dp/B093XL735D/ref=asc_df_B093XL735D/?tag=hyprod-20&linkCode=df0&hvadid=532608380633&hvpos=&hvnetw=g&hvrand=15444928858367076110&hvpone=&hvptwo=&hvqmt=&hvdev=c&hvdvcmdl=&hvlocint=&hvlocphy=9007348&hvtargid=pla-1387723674627&psc=1.

Tesla Model 3 Model Y Screen Side Phone Holder, Laptop Computer Monitor Expansion Bracket, Aluminum Slim Foldable Magnetic Smartphone Stand. https://www.amazon.com/gp/product/B091F8RXR5/ref=as_li_tl?ie=UTF8&camp=1789&creative=9325&creativeASIN=B091F8RXR5&linkCode=as2&tag=teslatech0b-20&linkId=ab5f77289a256a9c8524f9654fe7761a (visited Sep. 27, 2021).

* cited by examiner

FIXED ANGLE CAR MOUNT FOR A MOBILE DEVICE

CROSS REFERENCE TO RELATED APPLICATIONS

This application is a continuation of U.S. application Ser. No. 17/545,362 filed Dec. 8, 2021 entitled Fixed Angle Car Mount for a Mobile Device.

BACKGROUND

Technological Field

Embodiments of the invention relate to a mount for a mobile device. More specifically embodiments of the invention relate to a car mount to maintain a mobile device in a fixed orientation.

Background

Numerous car mounts for a mobile device exist. Various commercial products clamp to surfaces, adhere to surfaces or for example engage vent systems. Some mounts include wireless charging capacity. Generally, such systems have an articulating joint that allows the orientation of the face of the mobile phone to be user adjusted.

Increasingly, cars include a display screen that is not integrated into the dashboard but has a fixed relation with the steering wheel. For example, the Tesla® Model 3 includes a discrete touch screen through which many functions of the car are controlled. Various models of articulating car mounts are designed to clamp to that screen. The phone screen is then repositioned using the articulating joint to face in a desired direction.

Recently, Apple Inc. of Cupertino California promulgated a "MagSafe®" specification for magnetic coupling to its iPhones®. Many state of the art smart phones enable wireless charging. Typically, the smart phone includes a receive Qi coil and supporting electronics. When the phone is placed in proximity to a Qi charger, the Qi transmit coil in the Qi charger induces a current in the receive coil that in turn charges the phone. To induce sufficient current to charge the phone, the distance between the transmit and receive coils should be a small as possible. Apple sells a Qi charger compatible with its MagSafe® specification that couples to MagSafe® compliant mobile devices. To charge the phones, the Qi charger couples magnetically directly to the MagSafe® interface on the phone or its compatible MagSafe® case. Various vendors offer MagSafe® compliant car mount chargers.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention provide a fixed angle car mount that provides wireless charging capability. Some embodiments have no moving parts to reduce the risk of distracted driving while ensuring the front facing camera of the device with a view of the user's face. Many newer phones require face recognition to unlock. By fixing the view of the front facing camera, hands free unlock is enabled. Moreover, as increased automation pervades the automobile market other functionality such as video conferencing is enabled with the same orientation.

Figure 1:
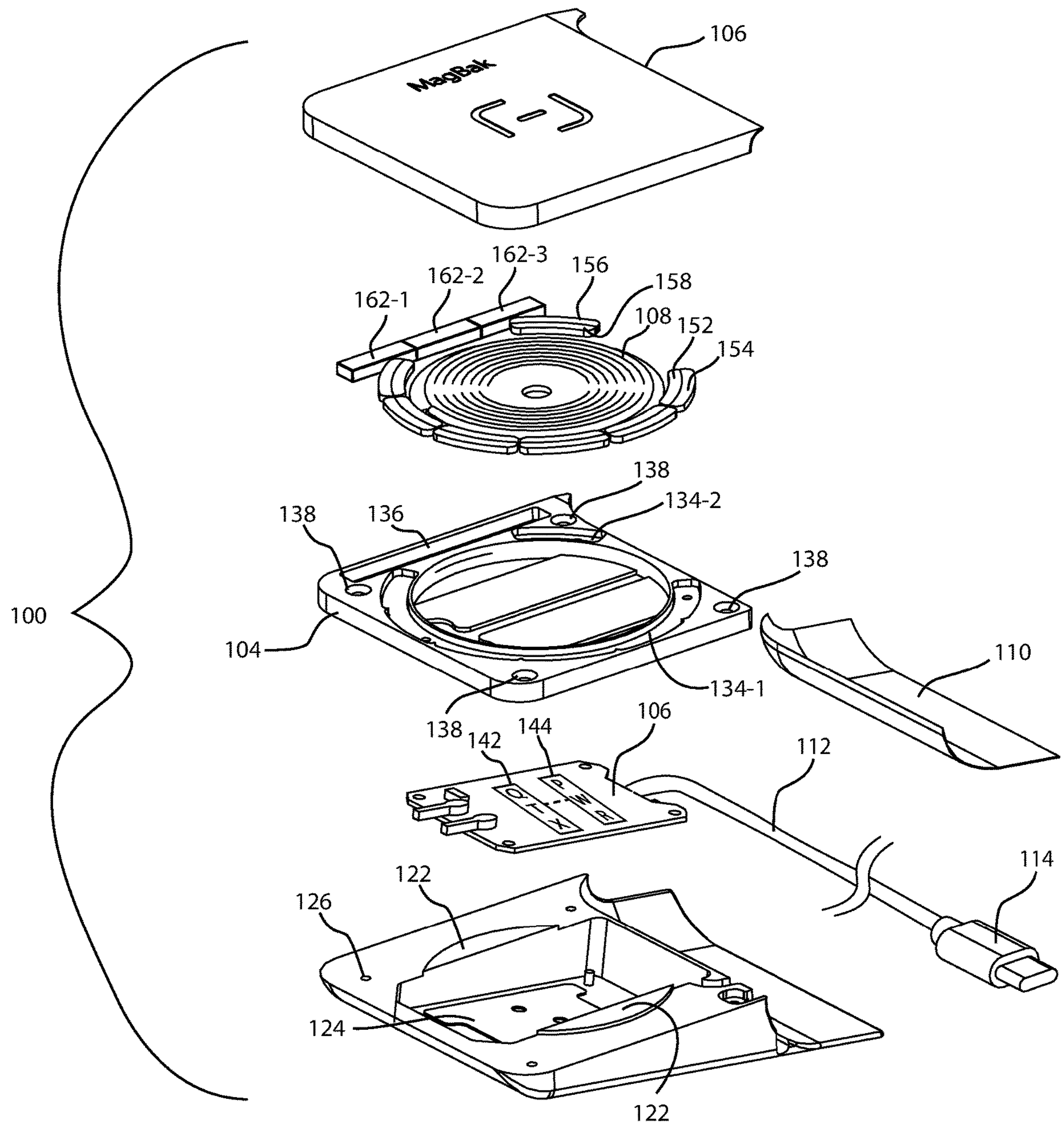
FIG. 1 is an exploded view of a car mount according to the embodiment of the invention.

FIG. 1 is an exploded view of a car mount according to the embodiment of the invention. Car mount 100 once assembled has no moving parts. That is, the car mount 100 once installed will have a single defined fixed angle at which it maintains a mobile device couple thereto.

Car mount 100 has a housing, that in the shown embodiment is formed as three constituent pieces: a back portion 102, a chassis 104 and a front cover 106. In some embodiments, the housing can be formed of more or fewer pieces. In one embodiment, front cover 106 is elastomeric. For example, front cover 106 may be formed of silicone rubber. Elastomeric materials tend to have favorable frictional characteristics with the materials of mobile devices and the cases therefor. The relatively high coefficient of friction adds additional retaining force to the magnetic coupling discussed below.

In one embodiment, chassis 104 is injection molded out of a synthetic resin. It is desirable to select a resin that once cured will remain stable when local temperatures exceed 70° C. Polycarbonate has been found suitable. Alternatively, chassis 104 could be milled or cast from a metal such as aluminum or the like. In one embodiment, chassis 104 defines one or more arcuately arranged recesses 134-1, 134-2 (generically recesses 134) dimensioned to receive a first arrangement of magnetic material 152, 154, 156, 158. The first arrangement is described in greater detail below. Recesses 134 are distributed about the circumference of a circular space in the chassis 104 dimensioned to receive a Qi transmit coil 108. Transmit coil 108 resided within the circular space and is supported by one or more shelves 132 that form a partial floor of the circular space. In some embodiments, the shelves form less than 70% of the floor of the circular space.

In one embodiment, the first arrangement of magnetic material is such that an inner arc 152, 158 exposes a first polarity magnetic field and an outer arc of magnetic material 154, 156 exposes an opposite polarity magnetic field. For example, inner arc 152, 158 may expose a south polarity field and outer arc 154, 156 may expose a north polarity field, or vice versa. This arrangement ensures axial alignment between an attached device having a complementary magnetic arrangement. In some embodiments, inner arc 152, 158 and outer arc 154, 156 are arranged to be Magsafe® compliant.

In an alternative embodiment, inner arc 158 may expose the same polarity as outer arc 154 and outer arc 156 may expose the same polarity as inner arc 152. This arrangement would force a single orientation of the attached device.

While the first arrangement is shown as only partially surrounding the coil 108, embodiments in which the arrangement surrounds the entire circumference are deemed within the scope of the invention. Furthermore, embodiments in which recesses 134 are uniformly distributed around the circular space are also contemplated.

Chassis 104 may also have molded therein a linear recess 136 dimensioned to receive a second arrangement of magnets 162-1, 162-2, 162-3 (generically magnets 163). In some embodiments more or fewer than three magnets 163 may be used. For example, some embodiments may use two magnets or five magnets 163. Adjacent regions of the arrangement expose different polarities. For example, magnets 162-1 and 162-3 may expose a south polarity and magnet 162-2 may expose a north polarity, or vice versa. Preferably rare earth magnets are used for both the first and second arrangements of magnetic material. In some embodiments, the first and second arrangements of magnetic materials collectively force a particular orientation of an attached mobile device.

The recesses 134, 136 and the shelves 132 are molded such that when magnets 162, 152, 154, 156 and 158 as well as coil 108 reside within the chassis they are substantially flush with an upper surface of the chassis. This provides a substantially flat surface to which front cover 106 can be attached. In some embodiments, front cover 106 is attached to the chassis with a heat stable adhesive such as 9495MP commercially available from 3M Company. In other embodiments it may snap fit or pressure fit over the chassis. Front cover 106 is selected to be of a thickness that ensures sufficient magnetic field to retain the mobile device in the context of forces expected to be encountered during normal driving and also thin enough to enable effective wireless charging. Thickness in the range of 0.5 mm to .8 mm have been found satisfactory.

Chassis 104 may also be molded to define a plurality of countersunk screw ports to facilitate the coupling of the chassis 104 to back portion 102. Alternatively, screw holes may be omitted and the chassis can be coupled to the back portion with an appropriate adhesive.

Back portion 102 is preferably milled or cast from a conductive metal such as aluminum. In one embodiment, back portion 102 has a gross geometry with a roughly triangular cross section which provides the fixed angle of the car mount 100 as described in greater detail below. Back portion 102 may include screw holes 126 to align with the screw holes 138 of the chassis 104. Back portion 102 provides a platform 124 on which to mount a printed circuit board (PCB) 106. PCB 106 may have mounted thereon a Qi transmit controller 142 and a power controller 144. These may be instantiated as one or more microcontrollers, one or more ASICs or the like. A power cable 112 electrically couples to the PCB 106 with a vehicle power source. In some embodiments, power cable 112 may terminate in a USB connector 114 or the like. In some embodiments, power controller 144 provides current and/or voltage modulation to allow the charger to source power from different power sources within the vehicle. For example, some embodiments can operate on either five volts from a USB-C connection or 12 volts from a typical automobile auxiliary connection.

Back portion 102 acts as a heat sink for the PCB 106. Additionally, back portion 102 has assembly posts 122 that have the dual purpose of facilitating alignment of the chassis 104 on the back portion 102 and providing additional floor coverage for the circular space. When assembled the assembly posts 122 reside in conductive contact with the Qi coil 108 and act as a heat sink for the coil 108. In some embodiments, the contact between the assembly posts 122 represents greater than 30% of the surface area of a contacting side of the coil 108.

Back portion also includes an attachment extension 120. Attachment extension 120 has a display screen coupling surface with an arcuate contour to match an attachment edge of an intended display. In some embodiments, the coupling surface is shaped to conform to at least part of a corner of a specific display, such as for the Tesla® model 3. The corner conformance improves stability of the mount 100 when attached. An adhesive insert 110 is applied to the attachment extension 120. Adhesive insert 110 aggressively adheres and conforms to the coupling surface such that substantially the entire coupling surface is capable of adhesion to the display.

Figure 2:
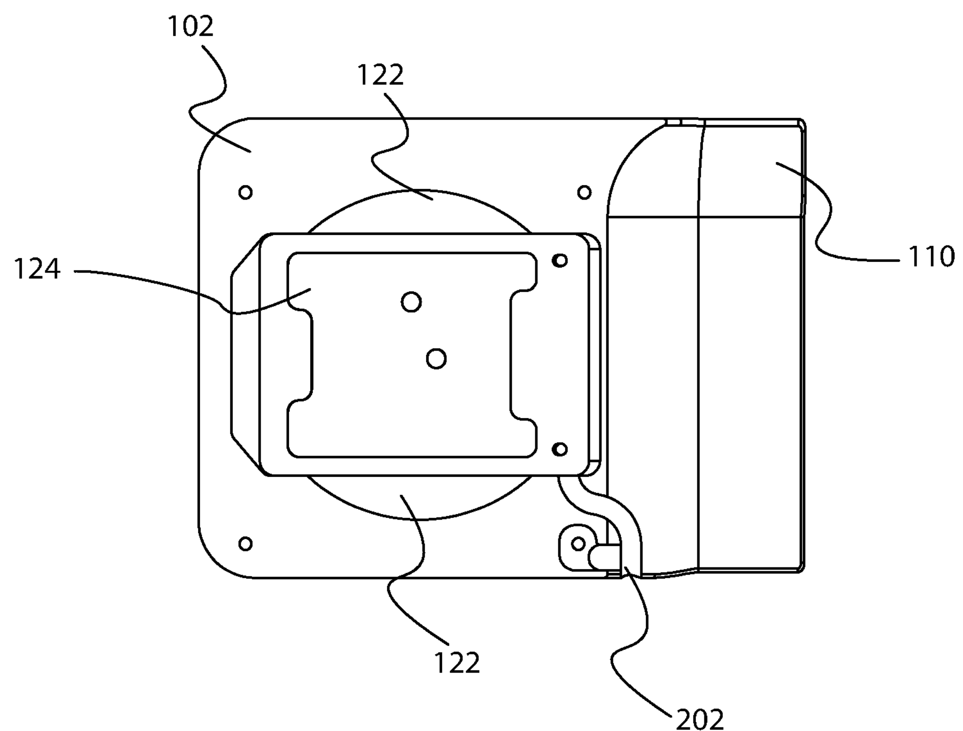
FIG. 2 is a plan view of a back portion of a housing of the car mount of FIG. 1.

FIG. 2 is a plan view of a back portion of a housing of the car mount of FIG. 1. In addition to the PCB platform 124 and the attachment posts 122, back portion defines a cord channel 202. Cord channel 202 runs from the PCB (not shown in this view) to immediately adjacent to the attachment extension 120. By laterally shifting the cord, to exit the housing at the attachment extension, the power cable will largely reside behind the display screen and provide a neater look to the installed device.

Figure 3:
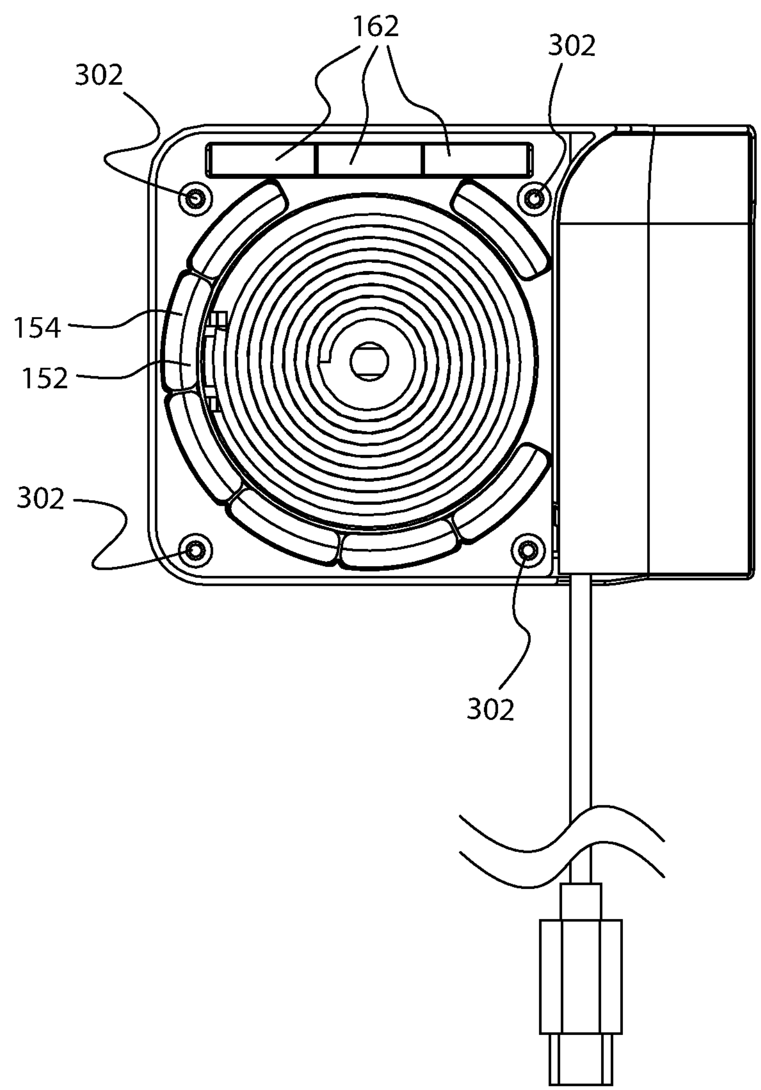
FIG. 3 is a plan view of the car mount of FIG. 1 with a front portion of the housing removed.

FIG. 3 is a plan view of the car mount of FIG. 1 with a front portion of the housing removed. Chassis 104 is coupled to the back portion (not shown) but assembly screws 302. Magnet material, 162, 154, 152 are seated in their respective recesses as described with reference to FIG. 1. Transmit Qi coil 108 similarly resides in the circular space in contact with the assembly posts of the back portion. Adhesive insert 110 exposes an aggressive adhesive over substantially is entire surface.

Figure 4A:
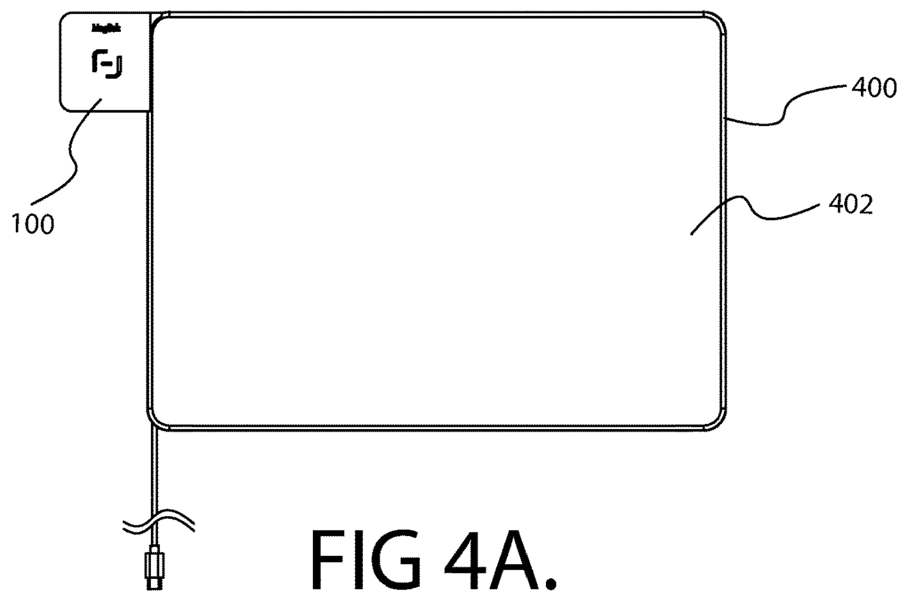
FIGS. 4A-4C are front, top, and rear views of the car mount of FIG. 1 installed on a display screen.
Figure 4B:
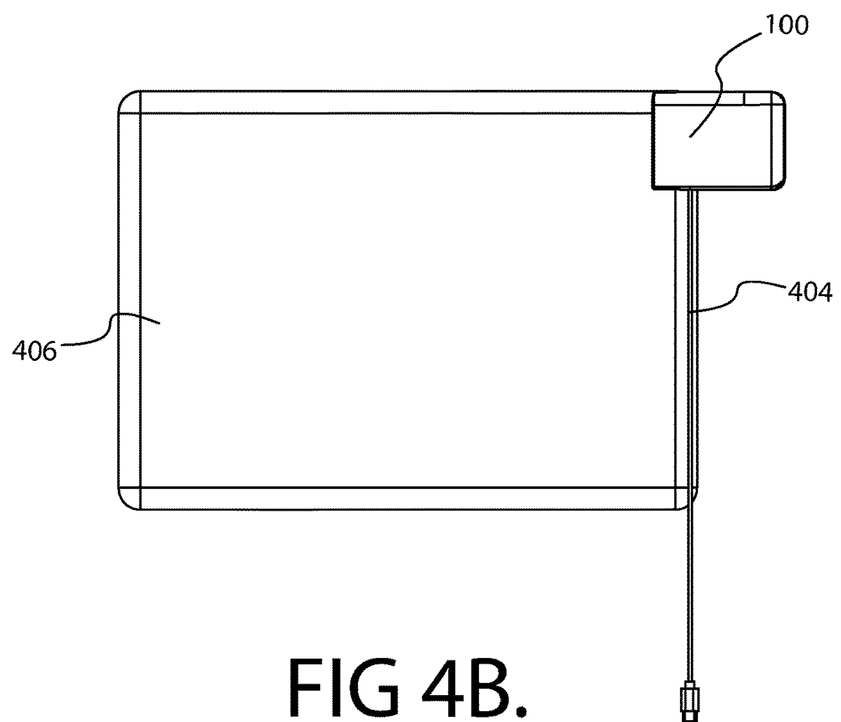
Figure 4C:
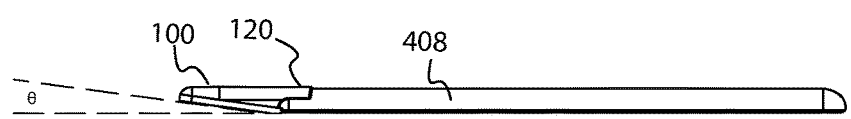

FIGS. 4A-4C are front, top, and rear views of the car mount of FIG. 1 installed on a display screen. In FIG. 4A the mount 100 is coupled to display 400. The active screen 402 is not occluded by the mount. Additionally, the cable 112 runs behind the screen 400. In FIG. 4B the coupling surface can be seen extending around the side edge 404 and on to the back 408 of the display 400. By wrapping the edge 408 and extending onto the back sufficient adhesive contact is achieved to securely retain a mobile device. In FIG. 4C attachment extension 120 can be seen wrapping over a portion of upper edge 408 of display 400. This provides some vertical support and reduces the stress on the adhesive coupling between the mount 100 and display 400. Once couple the display 400 the front surface of mount 100 defines a fixed acute angle ø relative to the plane in which the screen 402 resides. Angle θ is preferably in the range of 2.7-12.7 degrees. In one embodiment, θ is approximately 7.7 degrees. By having a fixed angle, the field of view of an attached device is always the same. By appropriately selecting the angle a view of the driver is assured, and there is never a need for the driver to be distracted by adjusting the positioning of the mobile device.

Figure 5:
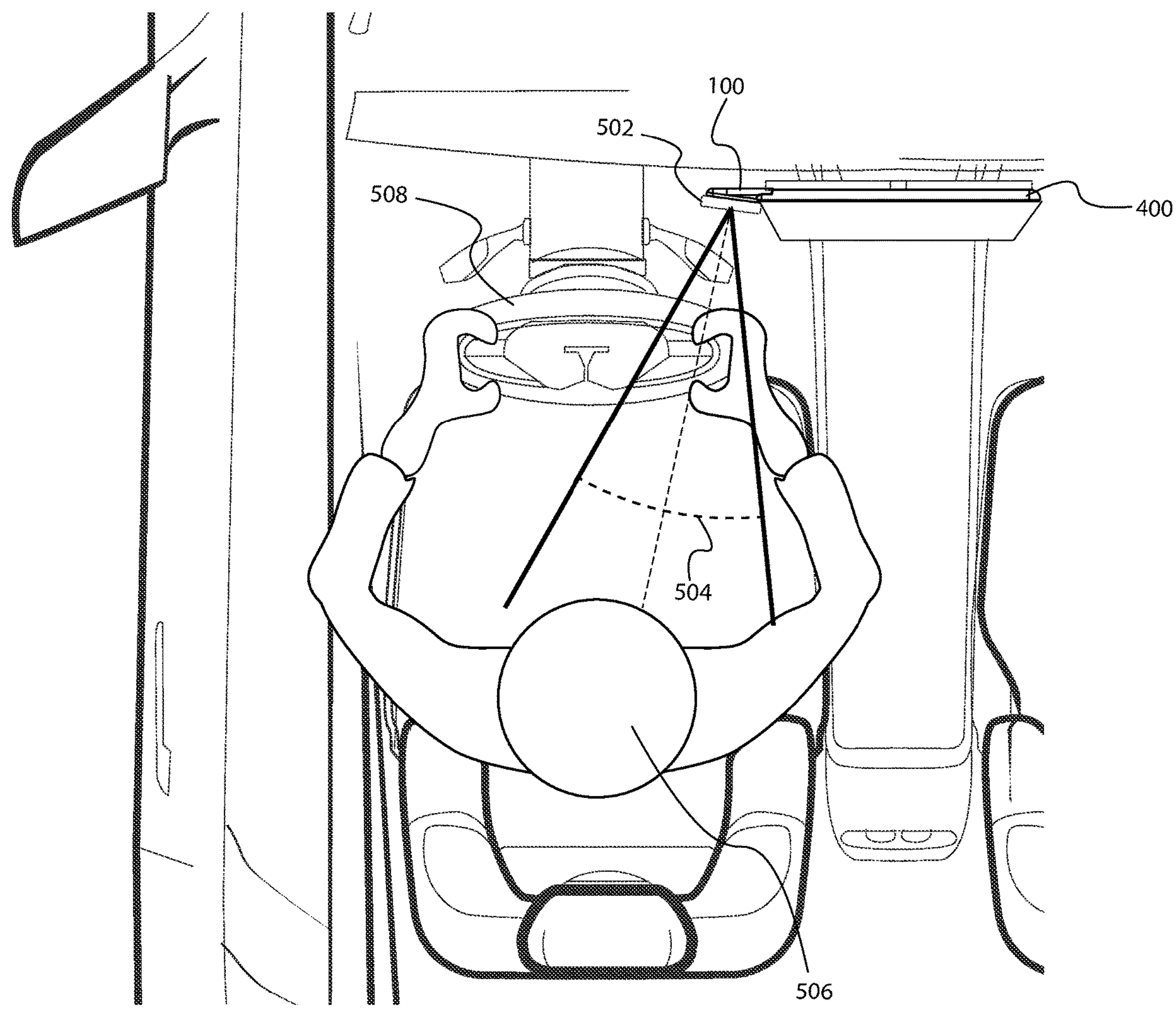
FIG. 5 is a schematic view of an interior of a vehicle with the car mount installed.

FIG. 5 is a schematic view of an interior of a vehicle with the car mount installed. Display 400 is shown with car mount 100 couple thereto. A mobile device 502 such as a smart phone magnetically couples to one or more of the magnetic arrangements within car mount 100. As a result of the fixed angle ø, the front side camera of mobile device 502 has a field of view 504 that is guaranteed to include the driver's face 506. As used herein "front side" camera is the camera whose field of view is on the same side as a display screen of the mobile device 502. The fixed position of the mount 100 and the magnetic coupling ensures that the attached mobile device 502 will not occlude the active display screen of display 400 and that the view 504 will not be occluded by the steering wheel 508. By ensuring the driver's face 506 will be in the field of view 502, hands free unlocking of the phone is enabled. Additionally, as improvements in autonomous driving accelerate other functionality such as video conferencing is enabled.

Figure 6:
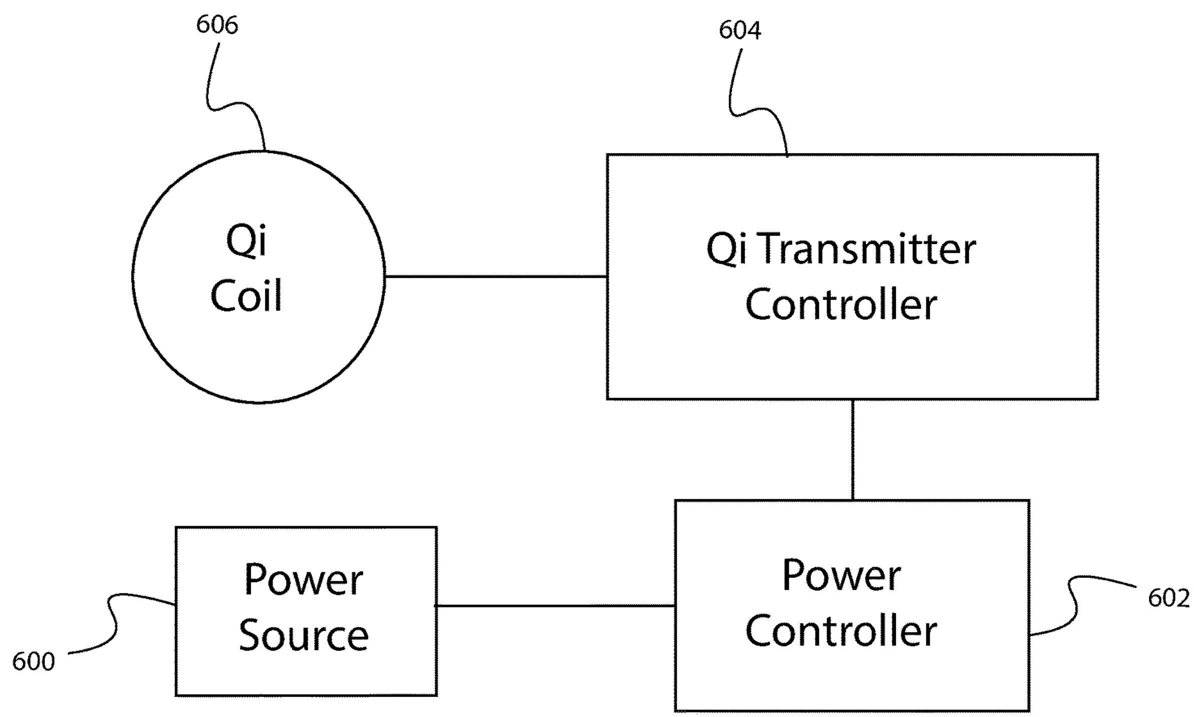
FIG. 6 is a block diagram of an internal mount charging system according to one embodiment of the invention.

FIG. 6 is a block diagram of an internal mount charging system according to one embodiment of the invention. A Qi transmit coil 606 is coupled to a Qi transmit controller 604. Transmit controller 604 drives Qi transmit coil 606 to induce a current in the Qi receiving interface of an attached mobile device (not shown). Transmit controller modulates the amount of current in the coil 606. The induced current wirelessly charges the mobile device. A power source 600 may be an automobile auxiliary power port, a USB port or the like. Power source 600 is electrically coupled to power controller 602. Power controller 602 modulates the supply of current to the Qi transmit controller. The transmit controller 604 and the power controller 602 may be instantiated as one or more microcontrollers, one or more ASICs or the like.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus for mounting a mobile device to an internal display screen of an automobile, the apparatus comprising:

a housing defining a volume and having a device side attachment surface and a back surface, the housing further having an attachment extension to couple to the internal display, the device side attachment surface having a permanently fixed orientation relative to the attachment extension;

a first arrangement of magnetic material disposed within the housing to expose a pattern of magnetic fields at the device side attachment surface; and wherein the attachment extension has a display screen coupling surface with an arcuate contour that substantially mates with a contour of the internal display screen.

2. The apparatus of claim 1 further comprising:

a wireless charger within the housing positioned such that the first arrangement of magnetic material aligns the mobile device for wireless charging.

3. The apparatus of claim 1 wherein the attachment surface forms an angle in the range of 2.7-12.7 degrees relative to a plane of the internal display screen when installed on the internal display screen.

4. The apparatus of claim 1 wherein the attachment surface forms an angle such that the driver is substantially centered in a view of a front facing camera of a phone when the phone is mounted to the apparatus.

5. The apparatus of claim 2 wherein the wireless charger comprises:

a transmit Qi coil; and a Qi controller to drive the transmit Qi coil responsive to proximity of a Qi receive coil.

6. The apparatus of claim 1 further comprising:

a power cable to couple the charger to a power source within the automobile.

7. The apparatus of claim 1 wherein the device side attachment surface is formed of a molded synthetic material.

8. The apparatus of claim 1 where in the material is elastomeric.

9. The apparatus of claim 1 further comprising:

an adhesive insert covering substantially all of the display screen coupling surface, the adhesive stable at least to temperatures of 50° C.

10. The apparatus of claim 1 wherein the housing comprises:

a metallic back portion;

a molded central chassis; and an elastomeric front portion.

11. The apparatus of claim 9 wherein the central chassis defines seats for the first arrangement of magnetic material, the seats defined to cause the magnetic material therein to be substantially flush with a device facing surface of the central chassis.

12. The apparatus of claim 2 wherein the housing comprises:

a metallic back portion;

a molded central chassis; and an elastomeric front portion and wherein the charger comprises a Qi coil and wherein the Qi coil seats within the central chassis to be in at least partial contact with the metallic back portion.

13. The apparatus of claim 11 wherein greater than 30% of a surface area of a back side of the Qi coil is in contact with the metallic back portion.

14. The apparatus of claim 1 further comprising:

a second arrangement of magnetic material disposed within the housing to expose a pattern of magnetic fields at the device side attachment surface.

15. The apparatus of claim 14 wherein the second arrangement is substantially linear and immediately adjacent regions of magnetic material expose opposite polarity magnetic fields at the device side attachment surface.

16. The apparatus of claim 1 wherein the pattern of magnetic fields exposed by the first arrangement forces the mobile device into exactly one orientation on the device side attachment surface.

17. The apparatus of claim 14 where in the magnetic fields of the first and second arrangements collectively limit possible orientations of the mobile device on the attachment surface to no more than four orientations.

* * * * *